US009582686B1

(12) United States Patent
Langhammer et al.

(10) Patent No.: US 9,582,686 B1
(45) Date of Patent: Feb. 28, 2017

(54) UNIQUE SECURE SERIAL ID

(75) Inventors: Martin Langhammer, Salisbury (CA);
Juju Joyce, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 1563 days.

(21) Appl. No.: 11/939,032

(22) Filed: Nov. 13, 2007

(51) Int. Cl.
G06F 21/00 (2013.01)
G07C 9/00 (2006.01)
G06F 21/72 (2013.01)
G06Q 20/34 (2012.01)
G06F 21/76 (2013.01)
G06K 19/073 (2006.01)

(52) U.S. Cl.
CPC ............ *G06F 21/72* (2013.01); *G06Q 20/341* (2013.01); *G06F 21/76* (2013.01); *G06K 19/07345* (2013.01)

(58) Field of Classification Search
USPC ............................................... 380/28; 726/34
See application file for complete search history.

(56) References Cited

U.S. PATENT DOCUMENTS 5,479,571 A * 12/1995 Parlos et al. .................... 706/25
7,200,235 B1 * 4/2007 Trimberger ................... 380/277
7,246,246 B2 * 7/2007 Kupka et al. .................. 713/189
2002/0047049 A1 * 4/2002 Perron et al. .................. 235/492
2006/0059345 A1 * 3/2006 Fayad et al. ................... 713/173
2006/0136717 A1 * 6/2006 Buer et al. ..................... 713/155
2007/0288765 A1 * 12/2007 Kean .............................. 713/193
2008/0082813 A1 * 4/2008 Chow ..................... G06F 21/34
713/2

OTHER PUBLICATIONS

Study on Hardware Protection Technique of Flash Disk, Huachun et al, IEEE 2007, The Eighth International Conference on Electronic Measurement and Instruments.*
Architecture and CAD for FPGAs, Hutton, IEEE 2004, Integrated Circuits and Systems Design, 2004. SBCCI 2004. 17th Symposium.*

* cited by examiner

*Primary Examiner* — Luu Pham
*Assistant Examiner* — Jahangir Kabir

(57) ABSTRACT

Methods, circuits, and apparatus are provided an FPGA user, ASIC designer, or the like the ability to program a unique ID per each circuit into a memory, such as a non-volatile one-time programmable memory bank on an FPGA. This unique ID is secure such that no one else can replicate it on another part, thus keeping it unique to the user for which it was intended. An encryption engine receives plaintext and produces the unique ID that is stored in memory that is designed to only be writeable through the encryption engine. Thus, the FPGA/ASIC designer can track who is the customer they sold this part to or who the last authorized user is.

13 Claims, 9 Drawing Sheets

_US 9,582,686 B1_

UNIQUE SECURE SERIAL ID

CROSS-REFERENCES TO RELATED APPLICATIONS

This application is related to commonly owned U.S. Patent Applications:

Ser. No. 11/042,477 "FPGA CONFIGURATION BITSTREAM PROTECTION USING MULTIPLE KEYS" by Langhammer et al., filed on Jan. 25, 2005; and Ser. No. 11/042,019 "FPGA CONFIGURATION BITSTREAM ENCRYPTION USING MODIFIED KEY" by Streicher et al., filed on Jan. 25, 2005; the disclosures of which are incorporated by reference in their entirety.

BACKGROUND OF THE INVENTION

The present invention relates generally to configuring programmable logic devices, such as field programmable gate arrays, and more particularly to allowing a developer to program a unique ID onto the programmable logic device.

Field programmable gate array devices are logic or mixed signal devices that may be configured to provide a user-defined function. Modern FPGAs contain hundreds of thousands of logic gates, as well as processors, memories, dedicated analog function blocks, and other circuits. Thus, these FPGAs can be a valuable commodity that a manufacturer, distributor or the like may want to track. The tracking may be for the purpose of internal supply chain management, but it may also be for more intensive tracking after it has left the hands of the manufacturer.

For example, a developer, vendor, systems integrator or the like, who utilizes and/or programs a circuit, may not want the FPGA to be used in a competitor's device or sold to a competitor. If this does happen, the vendor may want to find out who the FPGA was originally sold as this original buyer may be in violation of certain contractual or other obligations.

Integrated circuits with some identifying ID, such as an radio frequency ID, are available. This ID may be stored in a user-programmable non-volatile one-time-programmable memory. This allows FPGA user to program their own ID on to the part. However, there is no mechanism which prevents someone else from repeating that same Serial ID on another part or circuit. Thus, this circuit cannot be adequately traced. A unique ID could be installed by a manufacturer, but this could be problematic, for example, when the end user (vendor) needs to program their own unique ID.

Therefore, it is desirable to provided circuits, apparatus, and methods for providing a unique unit ID tag that cannot be easily replicated to another device.

BRIEF SUMMARY

Embodiments of the present invention provide an FPGA user, ASIC designer, or the like the ability to program a unique ID per each FPGA/ASIC into a memory, such as a non-volatile one-time programmable memory bank on the FPGA. This ID is secure such that no one else can replicate it on another part, thus keeping it unique to the user for which it was intended. In one aspect, this is accomplished with an encryption engine that receives plaintext and produces the ID that is stored in memory that is only writeable through the encryption engine. Thus, the FPGA/ASIC designer can track who is the customer they sold this part to or who the last authorized user is.

As used herein, the term "unique" does not require an impossibility that two circuits might randomly have the same ID, but that is computationally infeasible to replicate a known ID onto another circuit. As used herein, the term "user" includes a designer or anybody who may purchase and use a circuit form the original manufacturer. As used herein, the term "encryption" includes hashing functions, cryptographic functions, message authentication functions, or any combinations thereof.

According to an exemplary embodiment of the present invention, an integrated circuit includes an input port, an encryption engine, and a memory. The input port allows a user to transmit at least one plaintext to the integrated circuit. The encryption engine receives the plaintext and produces a unique ID by encrypting the plaintext. The memory is coupled with the encryption engine. At least a first portion of the memory is designed to only be writeable with data corresponding to the unique ID produced by the encryption engine.

According to another exemplary embodiment of the present invention, a method of programming a unique ID onto an integrated circuit is provided. Plaintext is input into an integrated circuit and encrypted. The result is used in generating a unique ID with an encryption engine on the integrated circuit. The ID is stored in a portion of a memory that is designed to only be writeable with data corresponding to the unique ID produced by the encryption engine.

In one embodiment, an adjustment number is stored on the integrated circuit. A unique serial ID is calculated based on the unique ID and the adjustment number. In one aspect, the unique serial ID is derived from the data stored in the first portion of the memory and from the adjustment number.

According to yet another exemplary embodiment of the present invention, another method of programming a unique ID onto an integrated circuit is provided. Plaintext is input into an integrated circuit and encrypted. The result is used to generate a unique ID with an encryption engine on the integrated circuit. An adjustment number is stored on the integrated circuit. A unique serial ID is calculated based on the unique ID and the adjustment number.

A better understanding of the nature and advantages of the present invention may be gained with reference to the following detailed description and the accompanying drawings.

DETAILED DESCRIPTION OF THE INVENTION

Embodiments of the present invention provide an FPGA user, ASIC designer, or the like the ability to program a unique ID per each FPGA/ASIC into a memory, such as a non-volatile one-time programmable memory bank on the FPGA. This ID is secure such that no one else can replicate it on another part, thus keeping it unique to the user for which it was intended. In one aspect, this is accomplished with an encryption engine that receives plaintext and produces the ID that is stored in memory that is designed to only be writeable through the encryption engine. Thus, the FPGA/ASIC designer can track who is the customer they sold this part to or who the last authorized user is.

It should be understood that the present invention can be applied to numerous types of integrated circuits including programmable logic integrated circuits, field programmable gate arrays, mask FPGAs, and application specific integrated circuits (ASICs) or application specific standard products (ASSPs) that provide programmable resources.

Figure 1:
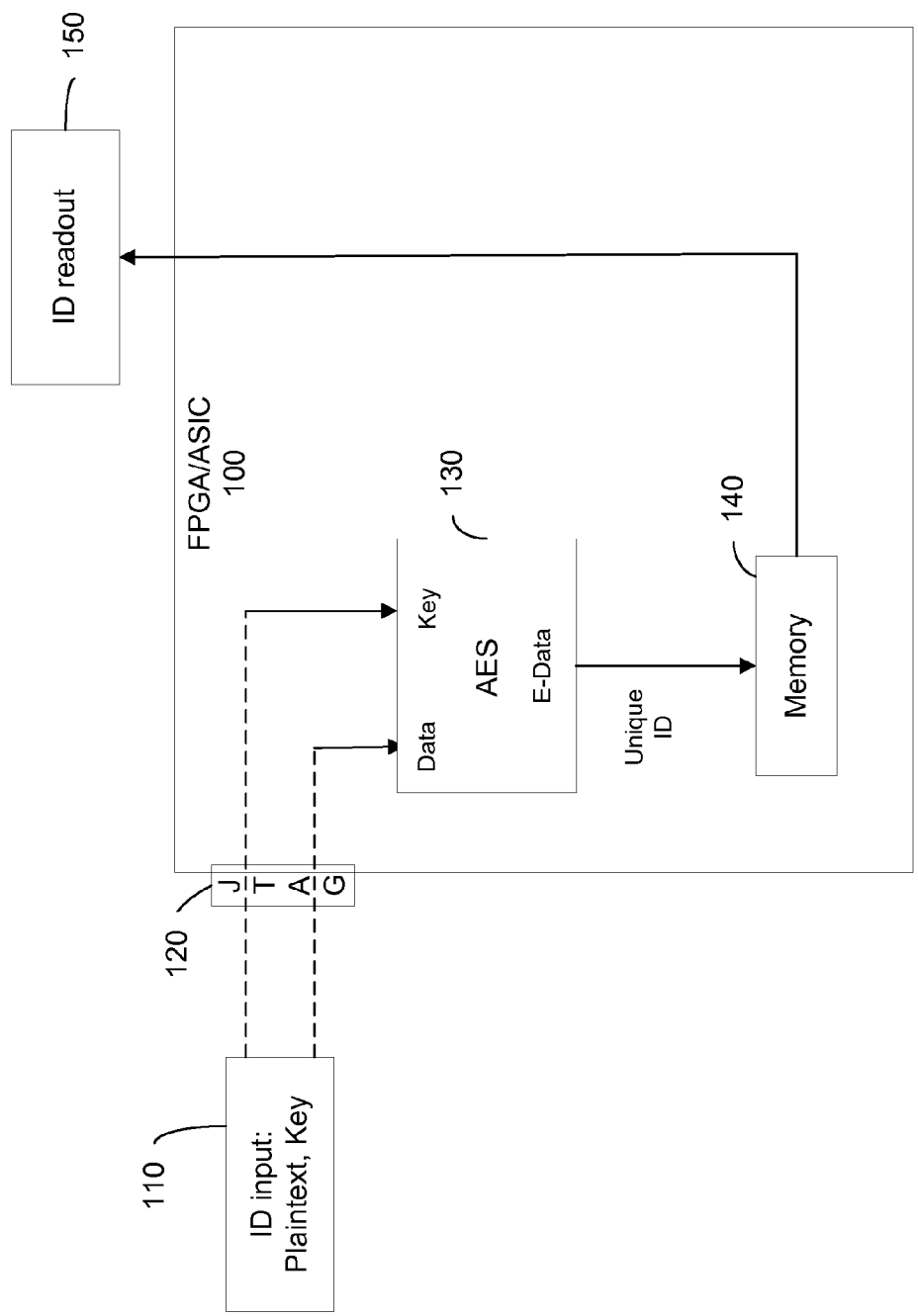
FIG. 1 is a block diagram illustrating an integrated circuit on which a unique ID may be written according to an embodiment of the present invention.

FIG. 1 is a block diagram illustrating an integrated circuit on which a unique ID may be written according to an embodiment of the present invention. Data 110 including plaintext, and possibly a key, is chosen for inputting into the circuit 100. The data 110 is input through an input port 120, such as a JTAG port. The input port 120 is coupled with an input of an encryption block 130. If data 110 includes plaintext and a key, each of these pieces of data may be input into the encryption block 130 through separate inputs.

Encryption engine 130 encrypts the plaintext (using the key if supplied) to generate a unique ID. By definition, the on-chip encryption engine 130 cannot be worked backwards, i.e. input vectors cannot be generated by looking at the output values. The encryption engine 130 may be any type or standard, such as Advanced Encryption Standard (AES) and Triple Data Encryption Algorithm (3DES). An output of the encryption engine 130, which produces the unique ID, is coupled with a memory 140. In one embodiment, memory 140 is a non-volatile one-time-programmable memory array, and is thus only designed to be written by the encryption engine 130. In another embodiment, memory 140 is volatile memory that is designed to only be written by encryption engine 130.

Memory 140 may be read out to produce ID readout 150. In one embodiment, anyone can read out the unique ID, but cannot replicate it on another part. The output port for reading out the unique ID may be a JTAG port or other output. Memory 140 may also be read out from within the integrated circuit 100.

In one embodiment, the end user may write a unique ID or not. In another embodiment, the manufacturer is not required to implement a unique ID method.

In theory, someone may be able to locate connections for the memory, but this would be very difficult if not impossible to do without destroying the circuit. Thus, in a practical sense, memory 140 can only be written by encryption engine 130. Accordingly, the unique ID is secure such that no one else can replicate it on another part, thus keeping it unique to the user and the part it was intended for.

This unique ID can then be used as a serial number, or for security and authentication. For example, the ID can uniquely identify parts and allow a FPGA/ASIC designer to track who is the customer they sold this part to. The ID may also establish ownership of design in a court of law. For example, if there is a question on who the original designer is, by providing the 'plaintext' and 'key' combination that generates the unique ID, the original designer can prove ownership and legal rights to the design in a court of law. In one aspect, this is applicable for proving ownership of a design of an ASIC circuit. In another aspect, for FPGA applications, a user can store a serial ID in the FPGA to establish ownership of the board design.

There are multiple ways that the ID memory 140 can be configured. For example, single or multiple IDs can be stored. Thus, a unique ID may be the result of multiple pieces of plaintext being encrypted. In another embodiment, in the case of a re-programmable storage technology (like FLASH), a write protect bit can be set to stop data (IDs and/or user data) from being overwritten. The write protect bit may be selectively controlled by the user/developer or automatic (automatically set after the first write).

In one embodiment, all of the ID memory 140 can be used for secure IDs. In another embodiment, some of the memory 140 can be directly user programmable (from outside and/or inside the device). As used here, the term directly means that the data is not encrypted or scrambled.

In one embodiment, a consecutive serial number facility can be supported via the ID storage. As the IDs will look like random numbers, an adjustment number can be stored as well. The externally readable serial number will be the ID plus or minus a function of the adjustment number. The adjustment can be calculated automatically by the device, e.g., a serial number can be entered as part of the unique ID generation sequence. In another embodiment, a serial number can be written directly to a portion of the ID memory 140 as mentioned above, and be write protected. For example, a user can provide a non-secure beginning of the ID, so that this beginning part can be used as a serial number for other purposes.

Figure 2:
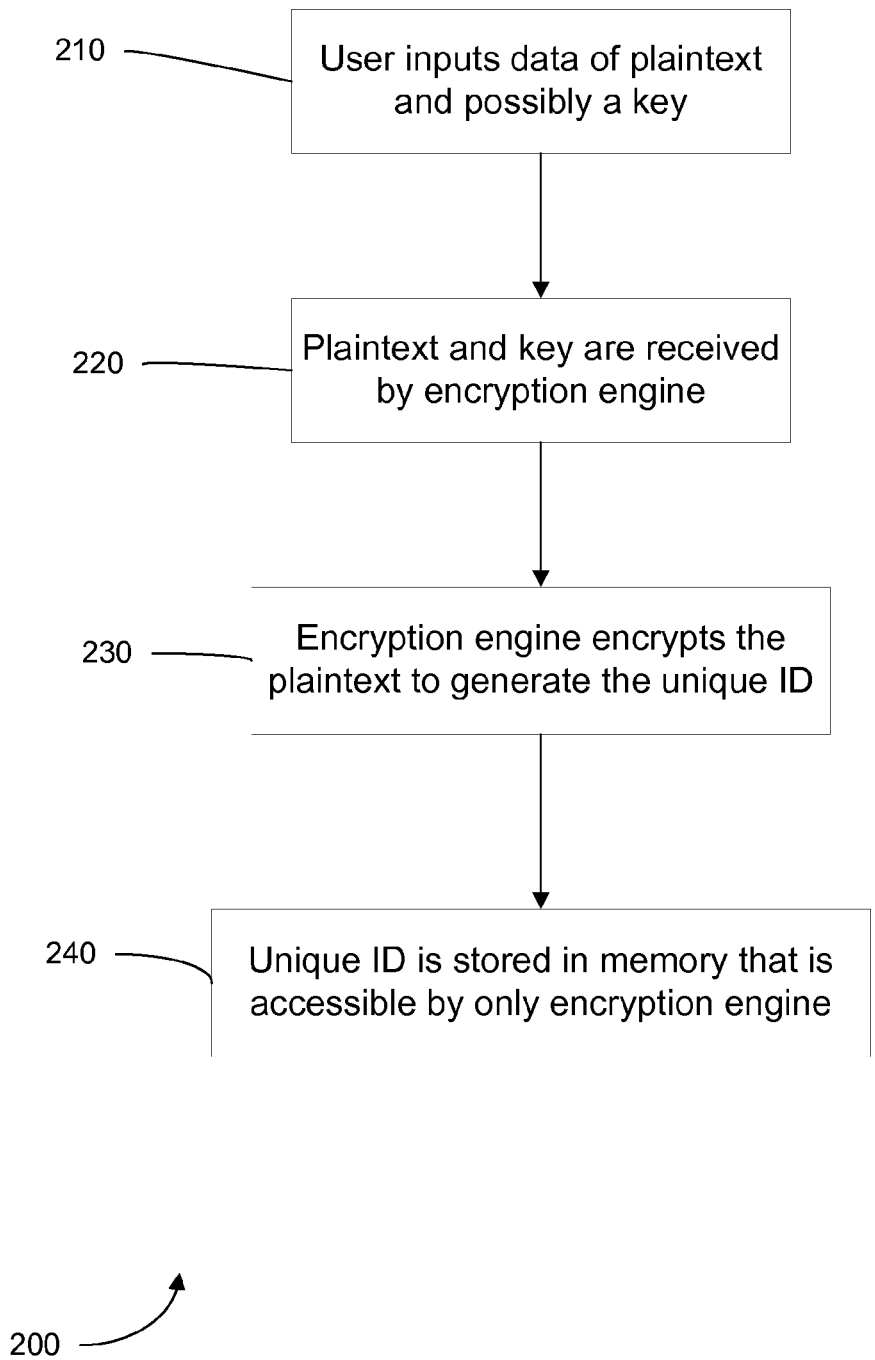
FIG. 2 is a flowchart illustrating a method for generating a unique ID on an integrated circuit according to an embodiment of the present invention.

FIG. 2 is a flowchart illustrating a method 200 for generating a unique ID on an integrated circuit according to an embodiment of the present invention. In step 210, a user inputs a block of plaintext to the encryption engine. In one embodiment, the user also inputs a key. Only the user knows the 'plaintext' and 'key', and therefore only the user can generate this particular unique ID. In step 220, the plaintext and the key, if provided, are received by the encryption engine.

In step 230, the encryption engine encrypts the plaintext to generate the unique ID. The encryption engine operates in a manner that another user cannot duplicate the unique ID. There are many ways of generating user specific IDs according to different embodiments of the present invention, such as hashing (e.g. SHA-1) or generating a MAC (message authentication code) from a user string. In one embodiment, the encryption engine is an encryption block already inside the device, such as used for bitstream encryption. In another embodiment, the encryption engine is dedicated to only generating the unique ID, as may be done with a hashing function. In one aspect, the encryption engine uses the key to encrypt the plaintext.

In step 240, the ID is then stored in a memory that can only be accessed by the encryption engine. In one embodiment, the storage mechanism is permanent (e.g. polyfuse or FLASH memory). In another embodiment, the ID is stored in volatile memory (RAM), which would only contain the ID while power was applied to the device. Either the entire device would be powered, or a power supply could be used for only the RAM, which would require only a very small current, and therefore be battery backed up.

When a cryptographic block is used to generate a hash or MAC, the field is usually the same size as the block size of the cryptographic algorithm, i.e. AES encrypts 128 bits at a time, so the ID would be 128 bits. When the plaintext is encrypted by the key, the result is a 128 bit value. This value can then be written to the ID memory. Although this value can be read out of the memory, both externally and internally to the device, an attacker will find it very difficult to duplicate this value, as he will have to find a "collision" through the AES core. The security of this approach can be strengthened using secrets and obfuscation.

Figure 3:
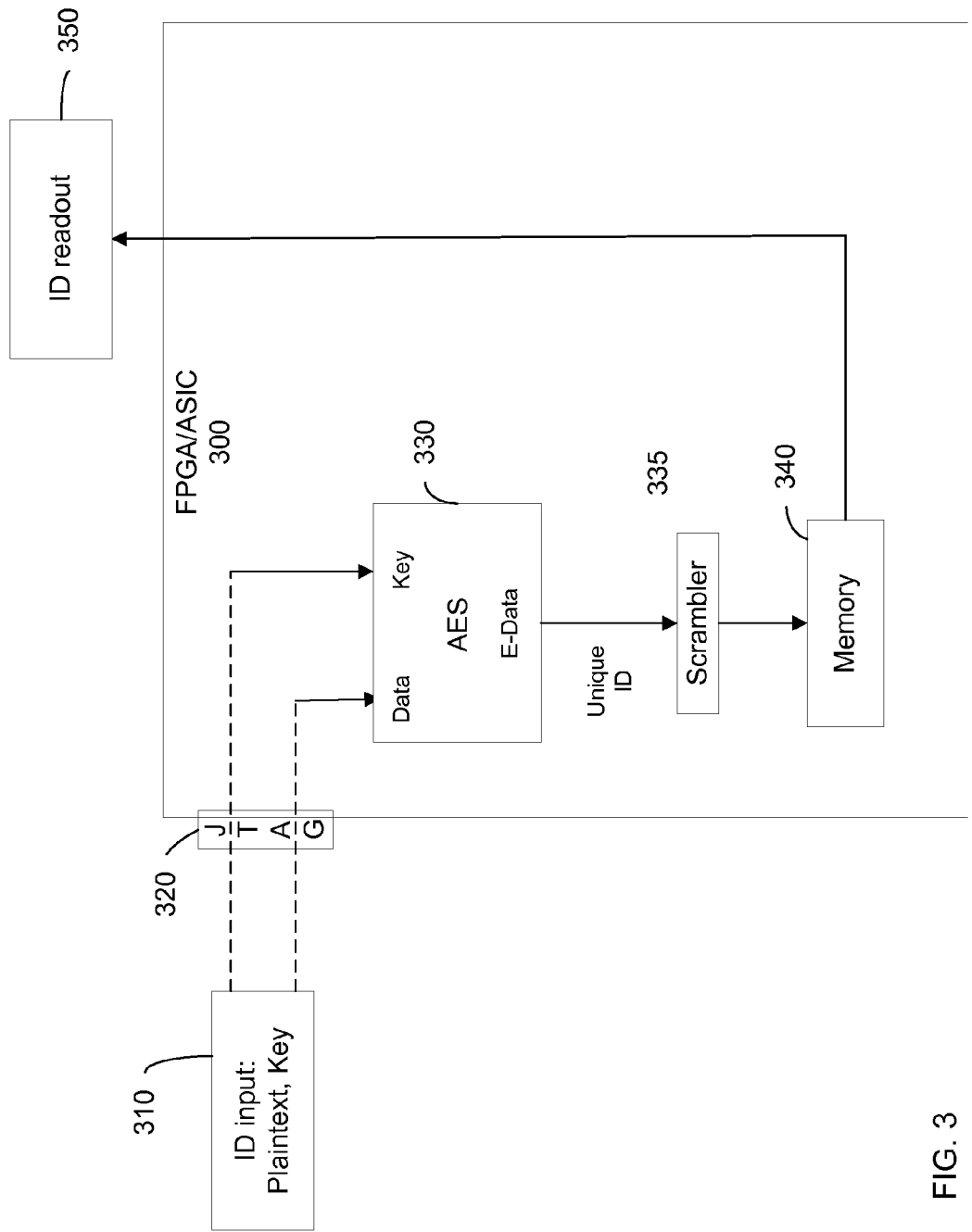
FIG. 3 is a block diagram illustrating an integrated circuit on which a unique ID may be written using a scrambler according to an embodiment of the present invention.

FIG. 3 is a block diagram illustrating an integrated circuit 300 on which a unique ID may be written using a scrambler according to an embodiment of the present invention. Data 310 including plaintext is chosen for inputting into the circuit 300. The data 310 is input through an input port 120, which is coupled with an input of an encryption block 330.

Encryption engine 330 encrypts the plaintext (using a key if supplied) to generate a unique ID. An output of the encryption engine 330, which produces the unique ID, is coupled with a scrambler 335 for scrambling the unique ID. A memory 340 that is designed to only be written by encryption engine 330 is coupled with scrambler 335.

Thus, in one embodiment, the sequence of the output bits can be scrambled between the AES core and the storage locations. Thus, the data written to the memory 140 corresponds to data that is output from the AES core. The unique ID may be termed as being either the output from the encryption engine 330, or to data derived from unique ID by scrambler 335, both of which correspond to the unique ID. In one aspect, scrambler 335 may be part of the encryption engine 330.

Although the chance of a collision through AES is unchanged by this method, the ID generation sequence cannot be simply modeled based on public information (e.g. the FPGA manufacturer may choose to disclose that AES is the underlying algorithm). The scrambler relates how the data (unique ID) is written to the memory. For example, bits may be inverted or bits may be swapped, or other functions may be performed. Thus, the sequence cannot be modeled using software.

Accordingly, an attacker will have to first reverse engineer the device to find out what the scrambling matrix is before modeling it. An attacker cannot mount an attack without reverse engineering, as this would require programming a device with each attempt, which is intractable from both cost and time. Although the reverse engineering process can be done, it will still delay attacks by some amount of time— typically months. Also, unless the attacker shares the secret information, any other attacker will have to reverse engineer the device for their attacks.

Additionally, the location and function of the scrambler may be hidden or obfuscated. Sequence obfuscation is previously described in U.S. patent application Ser. No. 11/042,032 "Encryption Key Obfuscation and Storage", filed on Jan. 25, 2005; and U.S. patent application Ser. No. 11/042,937 "One-Time Programmable Memories for Key Storage", filed on Jan. 25, 2005; the disclosures of which are incorporated by reference in their entirety.

Figure 4:
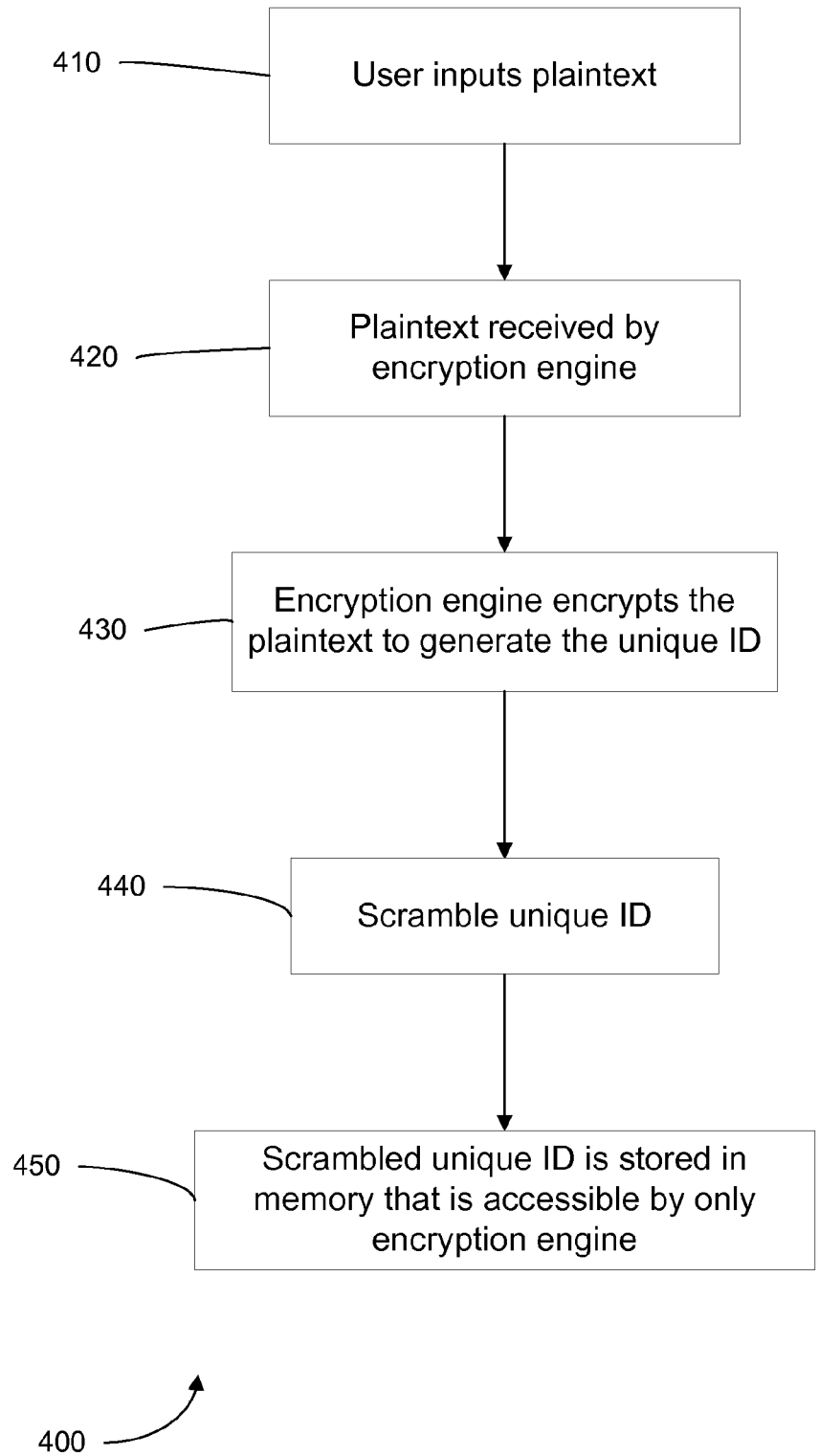
FIG. 4 is a flowchart illustrating a method for generating a unique ID and scrambling the ID on an integrated circuit according to an embodiment of the present invention.

FIG. 4 is a flowchart illustrating a method 400 for generating a unique ID and scrambling the ID on an integrated circuit according to an embodiment of the present invention. In step 410, a user inputs a block of plaintext to the encryption engine, and optionally a key. In step 420, the plaintext and the key, if provided, are received by the encryption engine.

In step 430, the encryption engine encrypts the plaintext to generate the unique ID. The encryption engine operates in a manner that another user cannot duplicate the unique ID. In one embodiment, the encryption engine uses the key to encrypt the plaintext. In step 440, the unique ID is scrambled. In one aspect, the bits of the unique ID are inverted, swapped, or other functions are performed.

In step 450, the scrambled ID is then stored in a memory that can only be accessed by the encryption engine. That is the data written to the memory is only obtained from the encryption engine.

For greater security, a longer ID can be generated. For example, two IDs could be generated, and written consecutively, but this would just half the chance of a collision. It is better to use a method where the two IDs are dependant on each other through the ID generation algorithm. The following section will show how a 256 bit secure ID can be generated.

Figure 5:
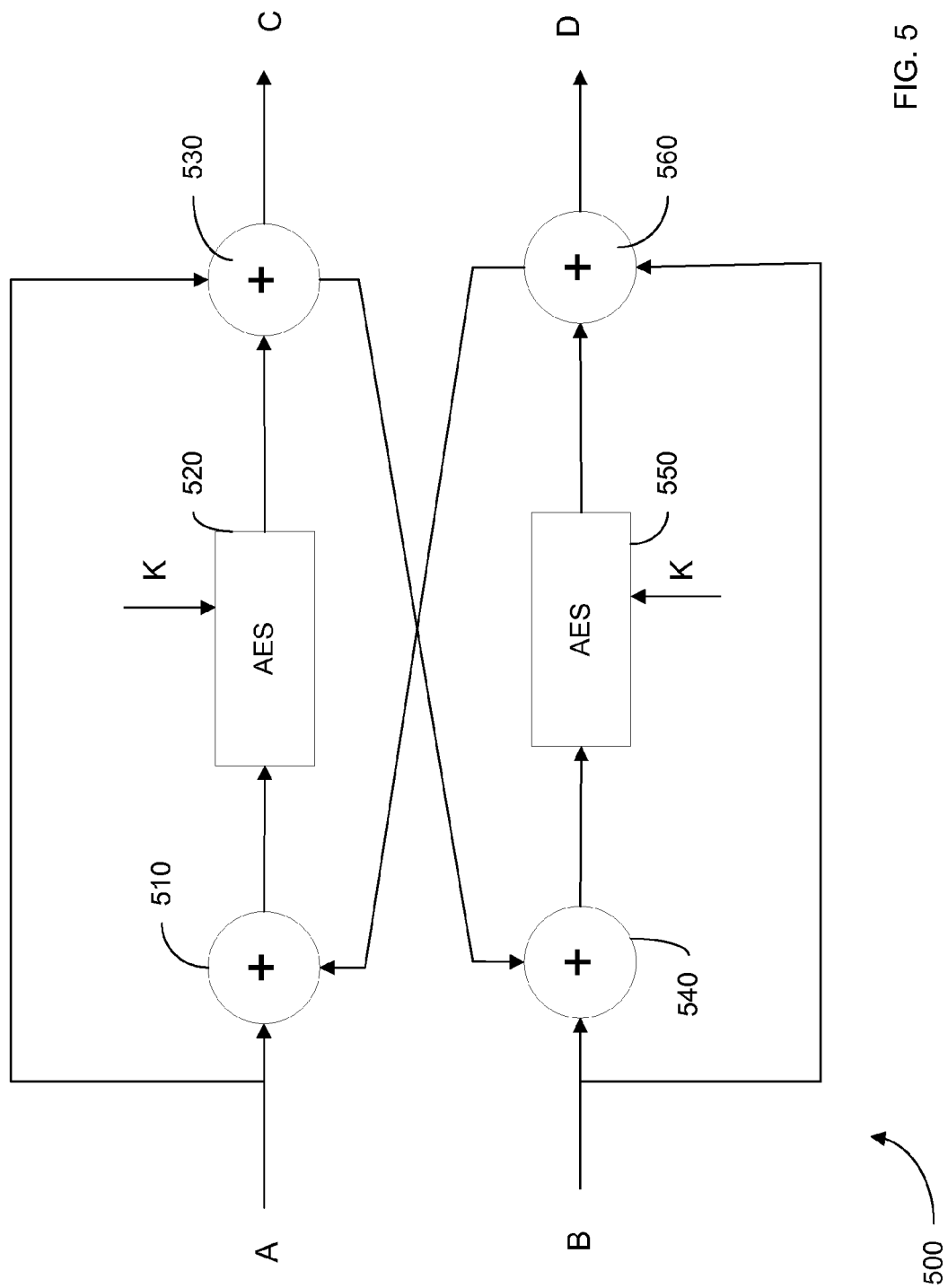
FIG. 5 is a block diagram of an encryption engine that creates a secure 2N-bit ID from two plaintext data of length N according to an embodiment of the present invention.

FIG. 5 is a block diagram of an encryption engine 500 that creates a secure 2N-bit ID from two plaintext data of length N according to an embodiment of the present invention. There are two encryption cores 520, 550, such as AES cores. Note that as described later, an embodiment may use a single AES core to save area.

Summing node 510 receives plaintext A, as well as result D, and sums these values. Summing node 530 also receives plaintext A, as well as a result from AES core 520, and sums these values to produce the result C. Thus, the result C is dependent on result D.

Similarly, summing node 540 receives plaintext B, as well as result C, and sums these values. Summing node 560 also receives plaintext B, as well as a result from AES core 550, and sums these values to produce the result D. Thus, the result D is dependent on result C.

In this example, A and B are consecutive blocks of N-bit plaintext input by the user, and the secure ID would be the concatenation of C and D, or C and D taken individually. Two iterations through this circuit would be required to generate an effective secure 2N-bit ID. In addition, secrets like described above could be used to enhance the security of the ID.

Figure 6:
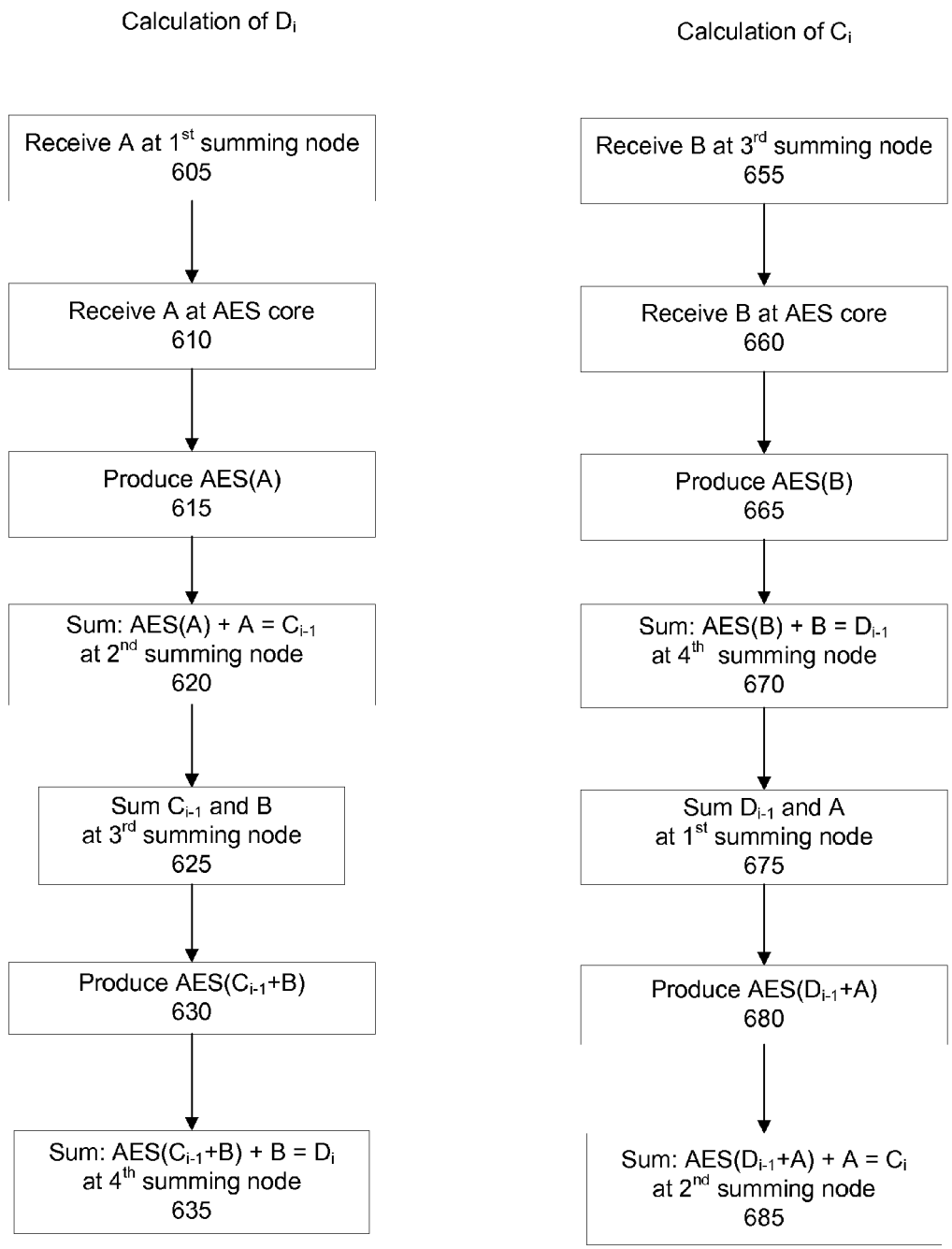
FIG. 6 depicts flowcharts of a method of creating a secure 2N-bit ID from two plaintext data of length N according to an embodiment of the present invention.

FIG. 6 depicts flowcharts of a method of creating a secure 2N-bit ID from two plaintext data of length N according to an embodiment of the present invention. In flowchart 600, the encrypted result $D_i$ from a lower output of FIG. 5. In flowchart 650, the encrypted result $C_i$ from the upper output of FIG. 5. This process flow is one example of creating a double length hash using block encryption cores and linear combinations of text. In one aspect, first order and second order pre-image resistance is not important, but collision resistance is. Other double length hashing algorithms based on encryption can be used as well, such as Hirose or Davies-Meyer In step 605, the plaintext A is received at a first summing node, e.g. 510. If this is the first iteration then the other input to the summing node would be zero. In step 610, plaintext A is received at an AES core, such as 520. In step 615, the encrypted result is produced. In one embodiment, the encrypted result is produced with a key K, the encrypted result of the core may be depicted as AES(A,K). In step 620, AES(A,K) is summed with A at a second summing node, such as 530, to produce $C_{i-1}$=AES(A,K)+A. The subscript i-1 signifies that the result $C_{i-1}$ is for the i-1th iteration. Note that as many iterations as desired may be performed.

In step 625, $C_{i-1}$ is summed with B at a third summing node, such as 540. In step 630, an AES core, such as 550, produces AES($C_{i-1}$+B,K) after having received $C_{i-1}$ and B. In step 635, AES($C_{i-1}$+B,K) is summed with B at a fourth summing node, such as 560, to produce $D_i$=AES($C_{i-1}$+B, K)+B.

In step 655, the plaintext B is received at a first summing node, e.g. 540. In step 660, plaintext B is received at an AES core, such as 550. In step 665, the encrypted result is produced. In one embodiment, the encrypted result is produced with a key K, the encrypted result of the core may be depicted as AES(B,K). In step 670, AES(B,K) is summed with B at a second summing node, such as 560, to produce $D_{i-1}$=AES(B,K)+B. The subscript i-1 signifies that the result $D_{i-1}$ is for the i-1th iteration. Note that as many iterations as desired may be performed.

In step 675, $D_{i-1}$ is summed with A at a third summing node, such as 510. In step 680, an AES core, such as 520, produces AES($D_{i-1}$+A,K) after having received $D_{i-1}$ and A. In step 685, AES($D_{i-1}$+A,K) is summed with A at a fourth summing node, such as 530, to produce $C_i$=AES($D_{i-1}$+A, K)+A. If additional iterations are performed, the plaintext A and B may change form iteration to iteration, every other iteration, or whenever it is desired.

Although the above example of FIG. 5 showed the use of two encryption cores, only one core may be used. An embodiment of a circuit with one encryption cores is shown in FIG. 7.

Figure 7:
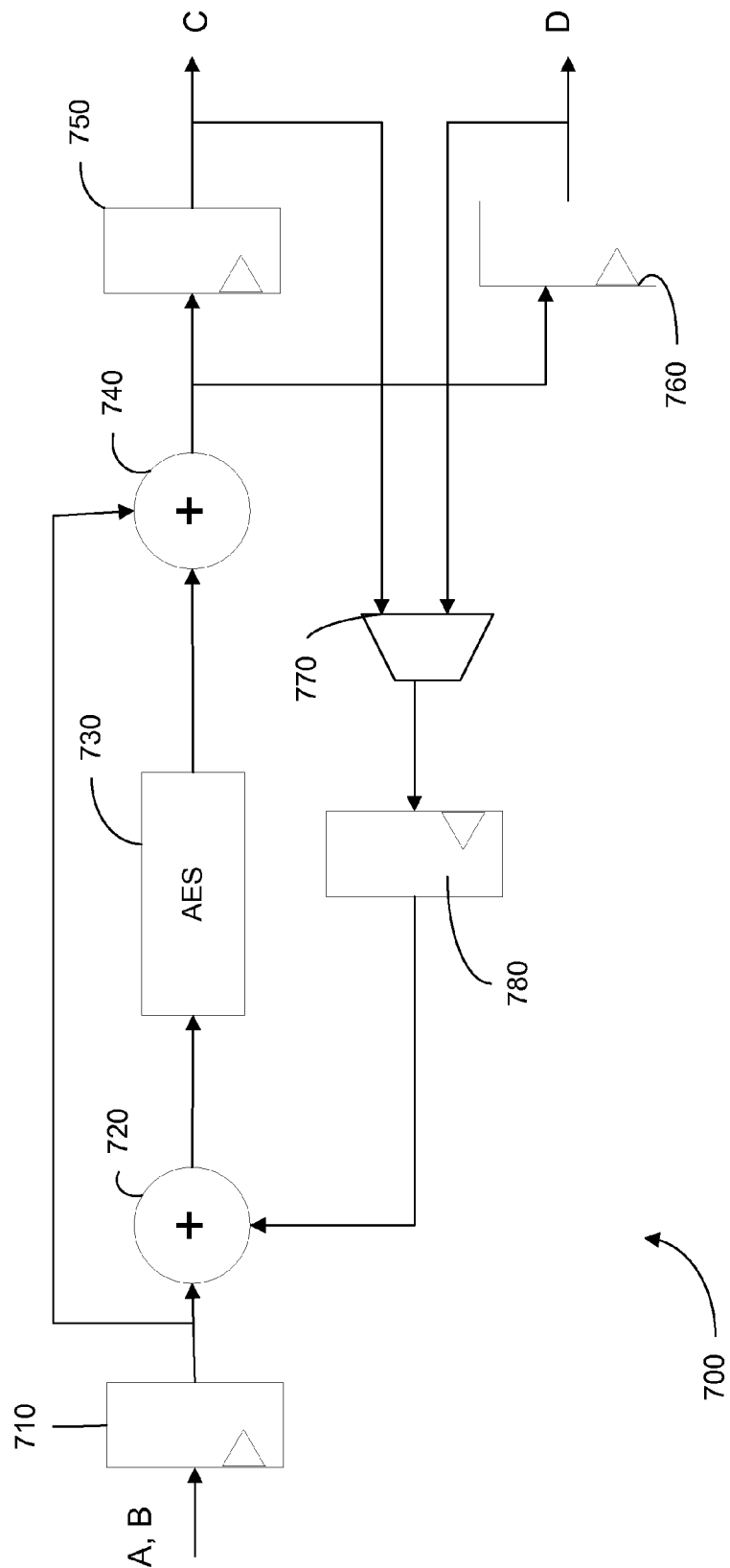
FIG. 7 is a block diagram of an encryption engine 700 that creates a secure 2N-bit ID from two plaintext data of length N using one encryption core according to an embodiment of the present invention.

FIG. 7 is a block diagram of an encryption engine 700 that creates a secure 2N-bit ID from two plaintext data of length N using one encryption core according to an embodiment of the present invention. As an example, the operation of encryption engine 700 is described with respect to the calculation of $D_i$.

The plaintext A is received at register 710 (or flip-flop or any other suitable device), which has an output coupled with summing node 720. As this is the first iteration, the other input to summing node 720 is zero. The plaintext A is then encrypted in encryption core 730, e.g., an AES core. The encrypted result AES(A) is then sent to summing node 740, where it is summed with A. The result AES(A)+A is then stored in register 750. Register 750 is chosen for storage over register 760 since the result corresponds to an entry of plaintext A. For results that correspond to an entry of plaintext B, register 760 is chosen. The selection between register 750 and register 760 may be done, for example, by clocking the registers with different leading edges of a clock signal or clock signals that have a set phase separation.

The result $C_{i-1}$=AES(A)+A is output from register 750 and selected by multiplexer 770 (or any other signal selection circuit) for sending to register 780. The output of register 760 would be selected by multiplexer 770 during the next iteration. The result $C_{i-1}$ is then sent to summing node 720, where it is summed with plaintext B, which has been input subsequently. The summed value of $C_{i-1}$+B is then encrypted in core 730 to produce AES($C_{i-1}$+B). The summing node 740 then sums AES($C_{i-1}$+B) and B to provide the result $D_i$ to register 760.

As described above, the stored ID can be read both from inside the chip and outside the chip. Connecting a memory in the hard logic (dedicated circuitry) of an FPGA to the general soft logic fabric of the device is described in U.S. patent application Ser. No. 11/517,689 "Security RAM Block", filed on Sep. 7, 2006. The ID can be used for authentication both inside and outside the device.

Figure 8:
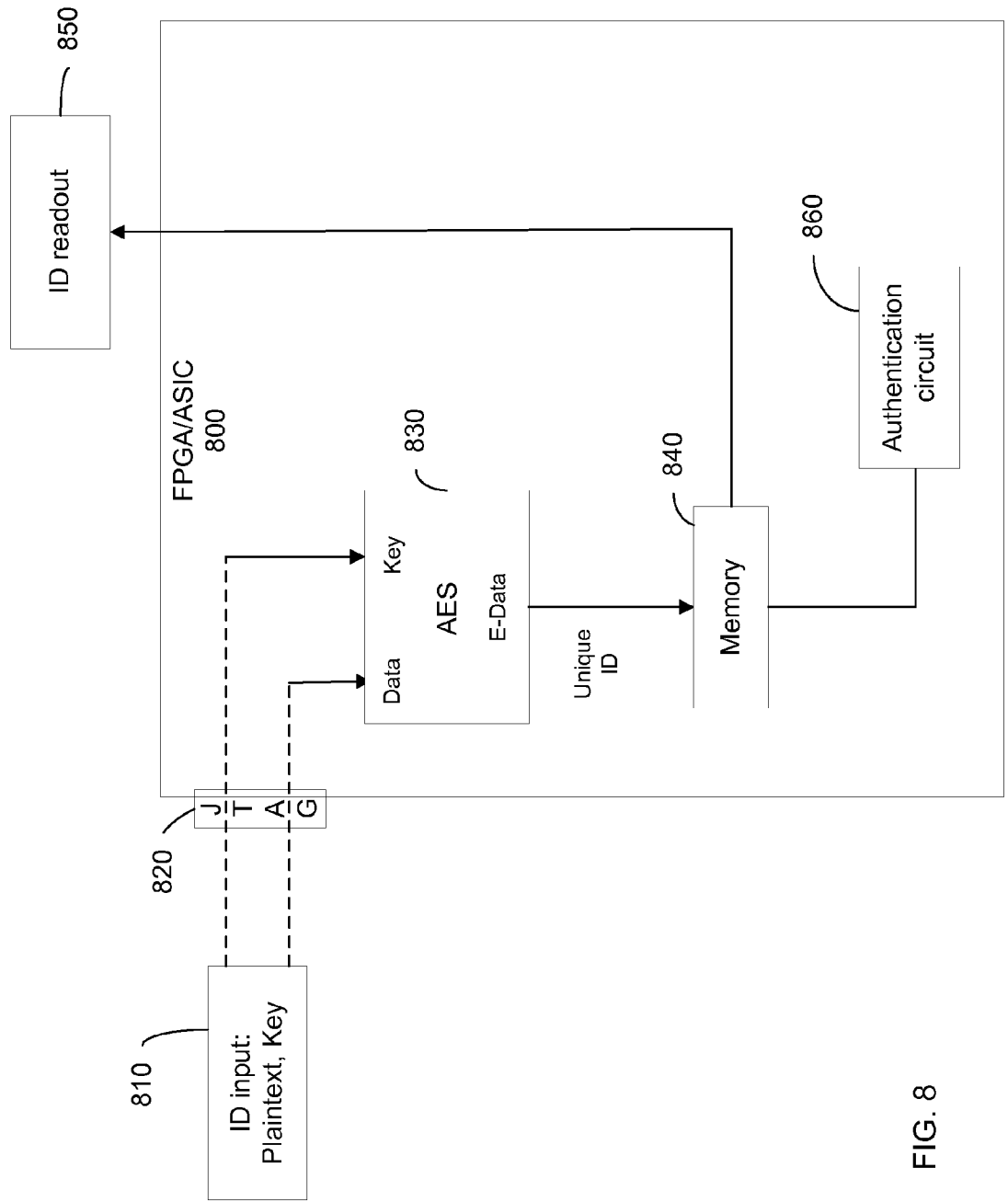
FIG. 8 is a block diagram illustrating an integrated circuit 800 on which a unique ID may be written and containing an authentication circuit according to an embodiment of the present invention.

FIG. 8 is a block diagram illustrating an integrated circuit 800 on which a unique ID may be written and containing an authentication circuit according to an embodiment of the present invention. As one benefit, the authentication circuit can be used to prevent an unauthorized change in the unique ID.

Authentication circuit 860 inside a design can read the unique ID from memory 840 and check the unique ID. If the unique ID is different than an expected value, the authentication circuit 860 stops the circuit 800 from running, i.e. an incorrect ID is not allowed. This embodiment is advantageously used when the memory may be written multiple times. The checking circuit can be obfuscated so that it cannot easily be bypassed by an attacker, e.g., by spreading it across the soft (configurable) logic in a design so that it cannot be discovered.

Figure 9:
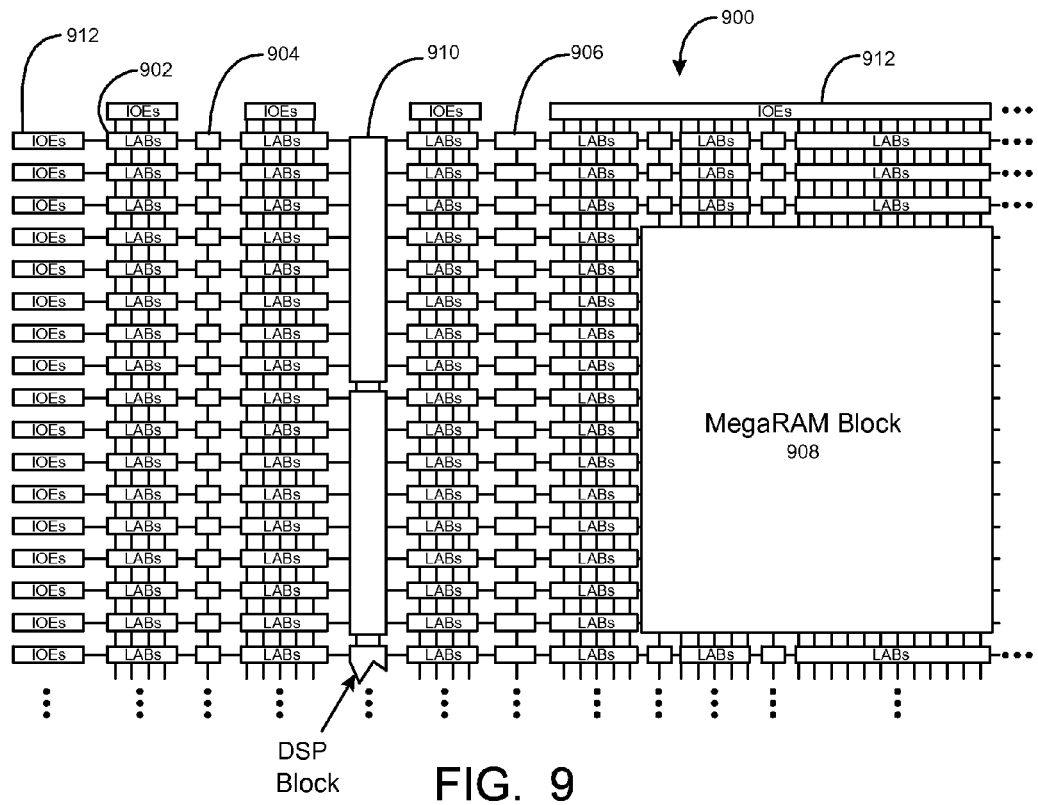
FIG. 9 illustrates a simplified block diagram of a programmable logic device that does benefit by incorporating embodiments of the present invention.

FIG. 9 is a simplified partial block diagram of an exemplary high-density programmable logic device (PLD) 900 wherein techniques according to the present invention can be utilized. PLD 900 includes a two-dimensional array of programmable logic array blocks (or LABs) 902 that are interconnected by a network of column and row interconnections of varying length and speed. LABs 902 include multiple (e.g., 10) logic elements (or LEs), an LE being a small unit of logic that provides for efficient implementation of user defined logic functions.

PLD 900 also includes a distributed memory structure including RAM blocks of varying sizes provided throughout the array. The RAM blocks include, for example, 512 bit blocks 904, 4K blocks 906 and an M-Block 908 providing 512K bits of RAM. These memory blocks may also include shift registers and FIFO buffers. PLD 900 further includes digital signal processing (DSP) blocks 910 that can implement, for example, multipliers with add or subtract features.

PLD 900 also includes input/output elements (IOEs) 912 for providing a communication interface with circuits and devices that are external to PLD 900. These other circuits or devices may reside on another circuit board, a same circuit board, or even the same chip. It is to be understood that PLD 900 is described herein for illustrative purposes only and that the present invention can be implemented in many different types of PLDs, FPGAs, and the other types of digital integrated circuits.

While PLDs of the type shown in FIG. 9 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, electronic displays, Internet communications and networking, and others.

Further, system 200 may be provided on a single board, on multiple boards, or within multiple enclosures.

Figure 10:
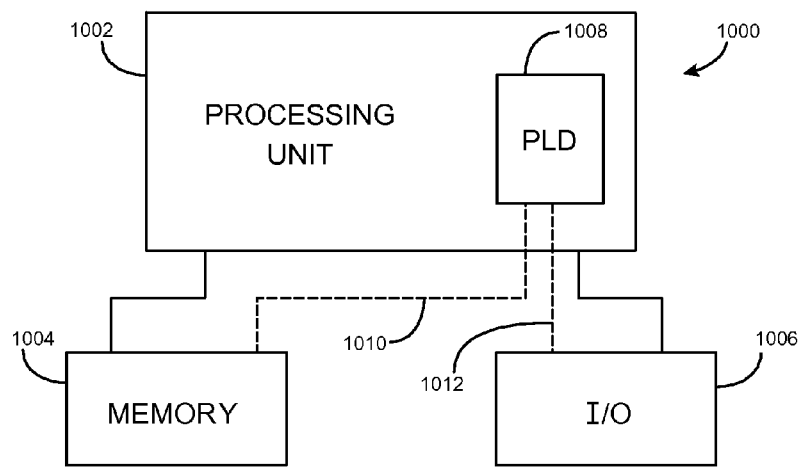
FIG. 10 illustrates a block diagram of an electronic system that does benefit by incorporating embodiments of the present invention.

System 1000 includes a processing unit 1002, a memory unit 1004 and an I/O unit 1006 interconnected together by one or more buses. According to this exemplary embodiment, a programmable logic device (PLD) 1008 is embedded in processing unit 1002. PLD 1008 may serve many different purposes within the system in FIG. 10. PLD 1008 can, for example, be a logical building block of processing unit 1002, supporting its internal and external operations. PLD 1008 is programmed to implement the logical functions necessary to carry on its particular role in system operation. PLD 1008 may be specially coupled to memory 1004 through connection 1010 and to I/O unit 1006 through connection 1012.

Processing unit 1002 may direct data to an appropriate system component for processing or storage, execute a program stored in memory 1004 or receive and transmit data via I/O unit 1006, or other similar function. Processing unit 1002 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 1008 can control the logical operations of the system. In an embodiment, PLD 1008 acts as a reconfigurable processor, which can be reprogrammed as needed to handle a particular computing task. Alternately, programmable logic device 1008 may itself include an embedded microprocessor. Memory unit 1004 may be a random access memory (RAM), read only memory (ROM), fixed or flexible disk media, PC Card flash disk memory, tape, or any other storage means, or any combination of these storage means.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   an input port configured to allow a provider of a circuit design to transmit at least one plaintext and at least one key to the integrated circuit, wherein:
      the plaintext is used to identify the provider of the circuit design,
      the integrated circuit is programmed with at least a portion of the circuit design from the provider of the circuit design, and the at least one key is used to encrypt the plaintext;
   a processor and a memory coupled with the processor, the processor configured to:
      receive the plaintext,
      use an encryption engine to encrypt the plaintext based on at least in part on the at least one key,
      receive the encrypted plaintext and generate a unique identifier (ID) of the programmed integrated circuit using a scrambler,
      store the unique ID in at least a first portion of the memory, wherein at least the first portion of the memory is writeable only by the encryption engine and at least a second portion of the memory is writeable by an authorized user,
      identify the provider of the circuit design based on the unique ID,
      store an adjustment number in the integrated circuit, and
      generate an externally readable serial number from the unique ID and the adjustment number; and
   an authentication circuit configured to:
      read the unique ID from the memory, and
      verify the unique ID;
   in response to the verification that the unique ID is different than an expected value, causes the integrated circuit to stop running; and
   in response to the verification that the unique ID matches the expected value, allows the integrated circuit to continue running.

2. The integrated circuit of claim 1, wherein the memory is a non-volatile one-time-programmable memory.

3. The integrated circuit of claim 1, wherein the encryption engine includes an Advanced Encryption Standard (AES) core.

4. The integrated circuit of claim 1, wherein the encryption engine performs a dedicated hashing function to produce the unique ID.

5. The integrated circuit of claim 1, wherein the processor is further configured to receive another plaintext and produce the unique ID, wherein at least part of said producing is based on the another plaintext.

6. The integrated circuit of claim 1, wherein the encryption engine includes:
   a first summing node having a first input that receives the plaintext;
   an encryption core having an input coupled with an output of the first summing node;
   a second summing node that has a first input coupled with an output of the encryption core and that has a second input that receives the plaintext;
   at least two registers, each having an input coupled with an output of the second summing node; and
   a multiplexer having respective inputs coupled with respective outputs of the at least two registers and having an output coupled with a second input of the first summing node.

7. The integrated circuit of claim 1, wherein the integrated circuit is a programmable logic device.

8. The integrated circuit of claim 1, wherein replicating a known unique ID on another integrated circuit is computationally infeasible, wherein the unique ID is stored into the first portion of the memory, and wherein generating the plaintext from the unique ID by a user proves that the user is the provider of the circuit design on the integrated circuit.

9. The integrated circuit of claim 1, wherein the unique ID is specific to the provider, and any person who is different from the provider is incapable of replicating the unique ID on another integrated circuit.

10. A method of programming a unique ID onto an integrated circuit, the method comprising:
   receiving plaintext, wherein the plaintext is used to identify a provider of a circuit design and wherein the integrated circuit is programmed with at least a portion of the circuit design from the provider of the circuit design;
   receiving at least one key;

encrypting, using an encryption engine and a scrambler, the plaintext to generate a unique identifier (ID) of the programmed integrated circuit based on at least in part on the at least one key;

identifying the provider of the circuit design based on the unique ID;

storing the unique ID in a memory on the integrated circuit, wherein at least a first portion of the memory is writeable only by the encryption engine and at least a second portion of the memory is writeable by an authorized user;

storing an adjustment number on the integrated circuit to generate an externally readable serial number from the unique ID and the adjustment number;

reading the unique ID from the memory with an authentication circuit;

verifying the unique ID with the authentication circuit;

in response to the verification that the unique ID is different than an expected value, stopping the integrated circuit from running; and in response to the verification that the unique ID matches the expected value, continuing running of the integrated circuit.

11. The method of claim 10, wherein the received plaintext is a first plaintext, the method further comprising:

receiving a second plaintext; and generating the unique ID, wherein at least part of the generating is based on encrypting the second plaintext using the encryption engine.

12. The method of claim 11, wherein generating the unique ID includes:

receiving a first sum of the first plaintext and the encrypted first plaintext at a first register;

selecting, with a multiplexer, an output of the first register to transmit to a first summing node;

summing the output of the first register and the second plaintext to form a second sum at the first summing node;

encrypting the second sum to produce a first encrypted result;

summing the first encrypted result with the second plaintext to produce a third sum;

receiving the third sum at a second register; and deriving the unique ID using the third sum.

13. The method of claim 10, further comprising directly writing a serial number to the at least a second portion of the memory.

* * * * *